(12) United States Patent
Obert et al.

(10) Patent No.: US 10,933,714 B2
(45) Date of Patent: Mar. 2, 2021

(54) CONTROL OF A CLIMATE SYSTEM WITHIN A VEHICLE USING LOCATION DATA

(71) Applicant: Ford Global Technologies, LLC, Dearborn, MI (US)

(72) Inventors: Emily Obert, Ferndale, MI (US); Frank Fusco, Plymouth, MI (US); Lawrence C. Karas, New Boston, MI (US); Loren John Lohmeyer, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 16/106,697

(22) Filed: Aug. 21, 2018

(65) Prior Publication Data

US 2020/0062078 A1    Feb. 27, 2020

(51) Int. Cl.
 *B60H 1/00* (2006.01)
(52) U.S. Cl.
 CPC ..... *B60H 1/00742* (2013.01); *B60H 1/00771* (2013.01); *B60H 1/00878* (2013.01); *B60H 1/00971* (2013.01)
(58) Field of Classification Search
 CPC ............ B60H 1/00742; B60H 1/00771; B60H 1/00878; B60H 1/00971; B60H 1/0005; B60H 1/00778; B60H 1/008; B60H 1/00849; B60H 1/00735; B60H 2001/00733; B60H 1/00642; B60H 1/00964
 See application file for complete search history.

(56) References Cited

U.S. PATENT DOCUMENTS

| | | | | | |
|---|---|---|---|---|---|
| 4,354,547 | A | * | 10/1982 | Sugiura ............. | B60H 1/00835 165/103 |
| 4,832,258 | A | * | 5/1989 | Hoshino ............ | B60H 1/00864 165/202 |
| 4,858,676 | A | * | 8/1989 | Bolfik ................ | B60H 1/00814 165/202 |
| 5,104,037 | A | * | 4/1992 | Karg .................. | B60H 1/00971 236/46 R |
| 5,157,932 | A | * | 10/1992 | Noji ................... | B60H 1/00964 236/78 D |

(Continued)

*Primary Examiner* — Jianying C Atkisson
*Assistant Examiner* — Jose O Class-Quinones
(74) *Attorney, Agent, or Firm* — David Coppiellie; Price Heneveld LLP

(57) ABSTRACT

A vehicle includes an interior and a controller configured to control a climate system for the interior based at least in part on data related to a departure location of the vehicle, a destination location of the vehicle, or a proximate location within a certain proximity to the vehicle, while moving to the destination location between the departure location and the destination location, or any combination of said locations. The data related to the departure location can include a temperature profile of the departure location. The temperature profile of the departure location can assume that the departure location is colder than a comfortable ambient temperature, and the controller is configured to direct heated air into the interior upon activation of the vehicle at the departure location. The data related to the departure location can include an activity profile of the departure location.

20 Claims, 4 Drawing Sheets

(56) References Cited

U.S. PATENT DOCUMENTS

| | | | | |
|---|---|---|---|---|
| 5,301,515 | A * | 4/1994 | Iritani | B60H 1/00392 |
| | | | | 62/126 |
| 6,108,602 | A * | 8/2000 | Bairamis | B60H 1/00735 |
| | | | | 701/36 |
| 6,698,663 | B2 | 3/2004 | Wang et al. | |
| 8,082,979 | B2 | 12/2011 | Greiner et al. | |
| 8,800,644 | B2 | 8/2014 | Greiner et al. | |
| 9,159,232 | B2 | 10/2015 | Ricci | |
| 2003/0039298 | A1 | 2/2003 | Eriksson et al. | |
| 2009/0150024 | A1 * | 6/2009 | Kojima | B60H 1/00642 |
| | | | | 701/36 |
| 2012/0293315 | A1 * | 11/2012 | Schunder | G08G 1/096775 |
| | | | | 340/438 |
| 2015/0127215 | A1 * | 5/2015 | Chatterjee | B60H 1/00657 |
| | | | | 701/36 |
| 2016/0144689 | A1 * | 5/2016 | Miller | B60H 1/00964 |
| | | | | 165/202 |
| 2016/0200166 | A1 * | 7/2016 | Stanek | H04W 4/44 |
| | | | | 165/202 |
| 2016/0318368 | A1 * | 11/2016 | Alger | B60H 1/00771 |
| 2017/0036511 | A1 | 2/2017 | Lee et al. | |
| 2017/0274737 | A1 * | 9/2017 | Delaruelle | B60H 1/00764 |

\* cited by examiner

CONTROL OF A CLIMATE SYSTEM WITHIN A VEHICLE USING LOCATION DATA

FIELD OF THE DISCLOSURE

The present disclosure generally relates to the control of a climate system for an interior of a vehicle.

BACKGROUND OF THE DISCLOSURE

Vehicles sometimes include a climate system to control the climate for the interior of the vehicle. However, such vehicles typically include numerous buttons, dials, touch screen user interfaces, and other physical ways for a user of the vehicle to manually control the climate system. The numerous manual controls sometimes confuse and frustrate the user. In addition, the numerous manual controls impart a manufacturing cost and occupy space in the vehicle that could be used for other purposes.

SUMMARY OF THE DISCLOSURE

According to one aspect of the present disclosure, a vehicle comprises: an interior; and a controller configured to control a climate system for the interior based at least in part on data related to a departure location of the vehicle, a destination location of the vehicle, or a proximate location within a certain proximity to the vehicle while moving to the destination location between the departure location and the destination location, or any combination of said locations.

Embodiments of the first aspect of the disclosure can include any one or a combination of the following features:
- the climate system includes a blower that directs air into the interior, a heating element in air communication with the blower, a cooling element in air communication with the blower, and a recirculation flap in air communication with the blower;
- the controller controls activation and deactivation of the blower, the volume of air that the blower directs to the interior, the heating element to increase the temperature of the air that the blower directs to the interior, the cooling element to decrease the temperature of the air that the blower directs to the interior, and the recirculation flap to control whether the blower draws air from the exterior to blow into the interior or draws air from the interior to recirculates the air from the interior;
- the controller is configured to control the climate system based at least in part on data related to the departure location;
- the data related to the departure location includes a temperature profile of the departure location;
- the controller is configured to control the climate system at least in part based on the temperature profile of the departure location;
- the temperature profile of the departure location assumes that the departure location is colder than a comfortable ambient temperature, and the controller is configured to direct heated air into the interior upon activation of the vehicle at the departure location;
- wherein the temperature profile of the departure location assumes that the departure location is warmer than a comfortable ambient temperature, and the controller is configured to direct cooled air into the interior upon activation of the vehicle at the departure location;
- the controller is configured to control the climate system based at least in part on data related to the departure location;
- the data related to the departure location includes an activity profile of the departure location;
- the controller is configured to control the climate system at least in part based on the activity profile of the departure location;
- the departure location has the activity profile that assumes that the user entering the vehicle after being at the departure location will have engaged in physical activity causing the user to be warm and sweaty, and the controller is configured to direct cooled air into the interior upon activation of the vehicle at the departure location;
- the controller is configured to control the climate system for the interior based at least in part on data related to the departure location of the vehicle;
- the controller is configured to weigh the data related to the departure location of the vehicle as a function of a length of time spent at the departure location, such that the longer the length of time the vehicle has spent at the departure location, the more weight the controller is configured to give to the data related to the departure location of the vehicle;
- the temperature profile of the departure location assumes that the departure location is colder than a comfortable ambient temperature, and the longer the length of time the vehicle has been at the departure location, the more likely the controller is to direct warmed air into the interior upon activation of the vehicle at the departure location;
- the controller is configured to control the climate system based at least in part on data related to the destination location;
- the data related to the destination location includes a temperature profile of the destination location;
- the controller is configured to control the climate system at least in part based on the temperature profile of the destination location;
- the temperature profile of the destination location assumes that the destination location is colder than a comfortable ambient temperature, and the controller is configured to direct warmed air into the interior before the vehicle arrives at the destination location;
- the temperature profile of the destination location assumes that the destination location is warmer than a comfortable ambient temperature, and the controller is configured to direct cooled air into the interior before the vehicle arrives at the destination location;
- the controller is configured to control the climate system based at least in part on data related to the proximate location;
- the data related to the proximate location includes an odor profile;
- the controller is configured to recirculate air from the interior based at least in part based on the odor profile;
- the data related to the departure location, the destination location, or the proximate location includes crowd data concerning control of the climate system of another vehicle;
- the controller is configured to recirculate air from the interior while the vehicle is within a certain proximity of the proximate location while en route to the destination location based on crowd data that one or more other vehicles also caused recirculation of air from the interior while those one or more other vehicles were in the certain proximity of the proximate location; and the controller is configured to control the climate system of the interior based at least in part on data related to the departure location of the vehicle, the destination location of the vehicle, and the proximate location.

According to a second aspect of the present disclosure, a vehicle comprises: an interior; and a controller configured to control a climate system for the interior based at least in part on data related to: information particular to a user of the vehicle; and a departure location of the vehicle, a destination location of the vehicle, and a proximate location within a certain proximity of the vehicle while the vehicle is en route to the destination location.

Embodiments of the second aspect of the disclosure can include any one or a combination of the following features:

the information particular to the user includes a heart rate of the user;

the departure location has an activity profile that assumes that the user entering the vehicle after being at the departure location will have engaged in physical activity causing the user to be warm and sweaty;

controller is configured to direct cooled air into the interior upon activation of the vehicle at the departure location, if the heart rate is above a predetermined heart rate;

the information particular to the user includes a body temperature of the user;

crowd data from other vehicles reveal that users of other vehicles have directed heated air into the interior of those other vehicles before arriving at the destination location;

the controller is configured to direct warmed air into the interior before arriving at the destination location, if the body temperature of the user is below a predetermined temperature;

the controller is further configured to control the climate system for the interior based in part on data related to environmental conditions at an exterior of the vehicle; and the environmental conditions include weather and air quality.

These and other aspects, objects, and features of the present disclosure will be understood and appreciated by those skilled in the art upon studying the following specification, claims, and appended drawings.

DETAILED DESCRIPTION

It is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
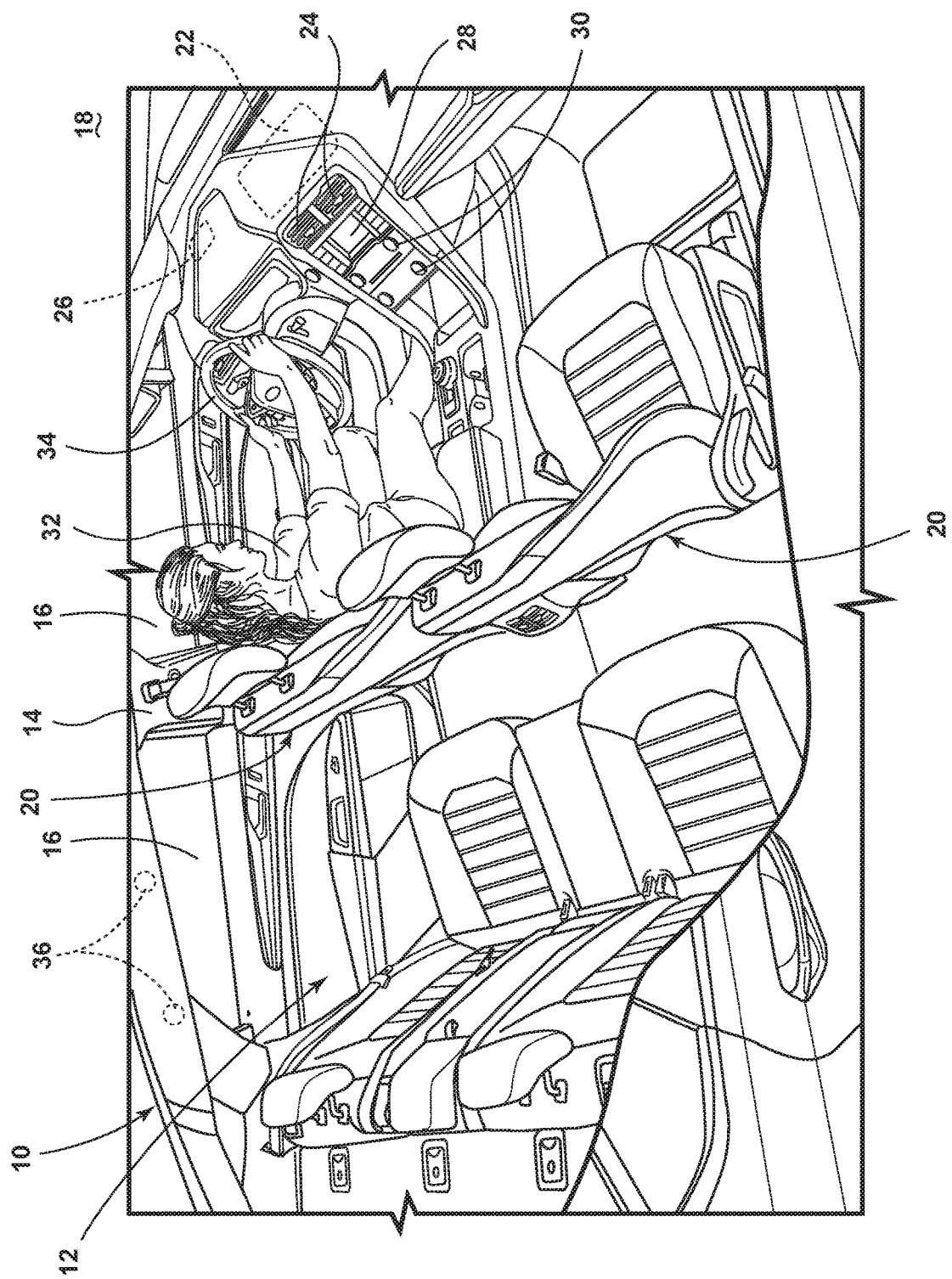
FIG. 1 is a perspective view of a vehicle of the present disclosure, illustrating a climate system for an interior of the vehicle.

Referring now to FIG. 1, a vehicle 10 includes an interior 12. A frame 14 and windows 16 separate the interior 12 of the vehicle 10 from an exterior 18 (environment). One or more seating assemblies 20 are located in the interior 12. The vehicle 10 further includes a climate system 22 for the interior 12, which controls the climate of the interior 12 by, among other ways, directing warmed or cooled air to the interior 12 through one or more vents 24. A controller 26 controls the climate system 22. The vehicle 10 can include a touch screen display 28 and various physical controls 30 (e.g., buttons, knobs, dials, and the like) in communication with the controller 26 to allow a user 32 to issue commands to the controller 26 to direct the climate system 22. The user 32 sits in one of the seating assemblies 20 during use and can manipulate the direction the vehicle 10 moves via a steering wheel 34. However, it should be understood that the vehicle 10 can be autonomously driven and can lack a steering wheel 34 entirely. The vehicle 10 further includes various devices and sensors 36 upon which the controller 26 relies to control the climate system 22. The vehicle 10 can be a car, truck, sports utility vehicle, van, tractor, and any such like transportation device.

Figure 2:
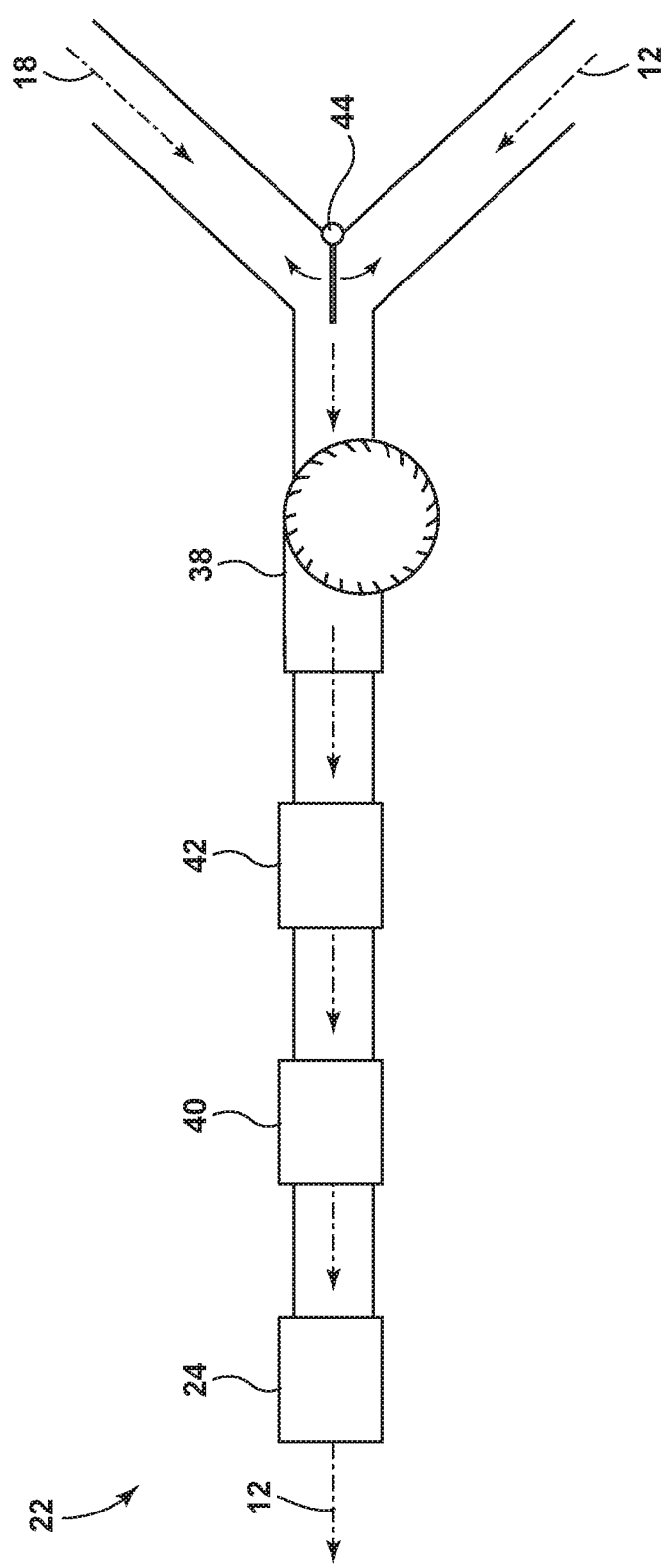
FIG. 2 is a simplified schematic diagram of the climate system of the vehicle of FIG. 1, illustrating a blower drawing air from either an exterior of the vehicle or the interior, and the air can be cooled by a cooling element or heated by a heating element en route through one or more vents and into the interior.

Referring now additionally to FIG. 2, the climate system 22 includes a blower 38. The blower 38 is in communication with the one or more vents 24. The blower 38 directs air through the one or more vents 24 and into the interior 12. The climate system 22 further includes a heating element 40 and a cooling element 42, both in air communication with the blower 38. The climate system 22 selectively heats, with the heating element 40, or cools, with the cooling element 42, air the blower 38 directs into the interior 12. The climate system 22 further includes a recirculation flap 44. The selective positioning of the recirculation flap 44 determines whether the blower 38 draws air from the exterior 18 to blow into the interior 12, or whether the blower 38 draws air from the interior 12 to recirculate the interior 12 air. The climate system 22 further includes the windows 16, which can be raised to prevent air from the exterior 18 from entering the interior 12, and lowered to allow air from the exterior 18 to enter the interior 12. These features of the climate system 22 are not exclusive, and can further include other features such as window defrost, heating of the seating assemblies 20, and cooling of the seating assemblies 20.

Figure 3:
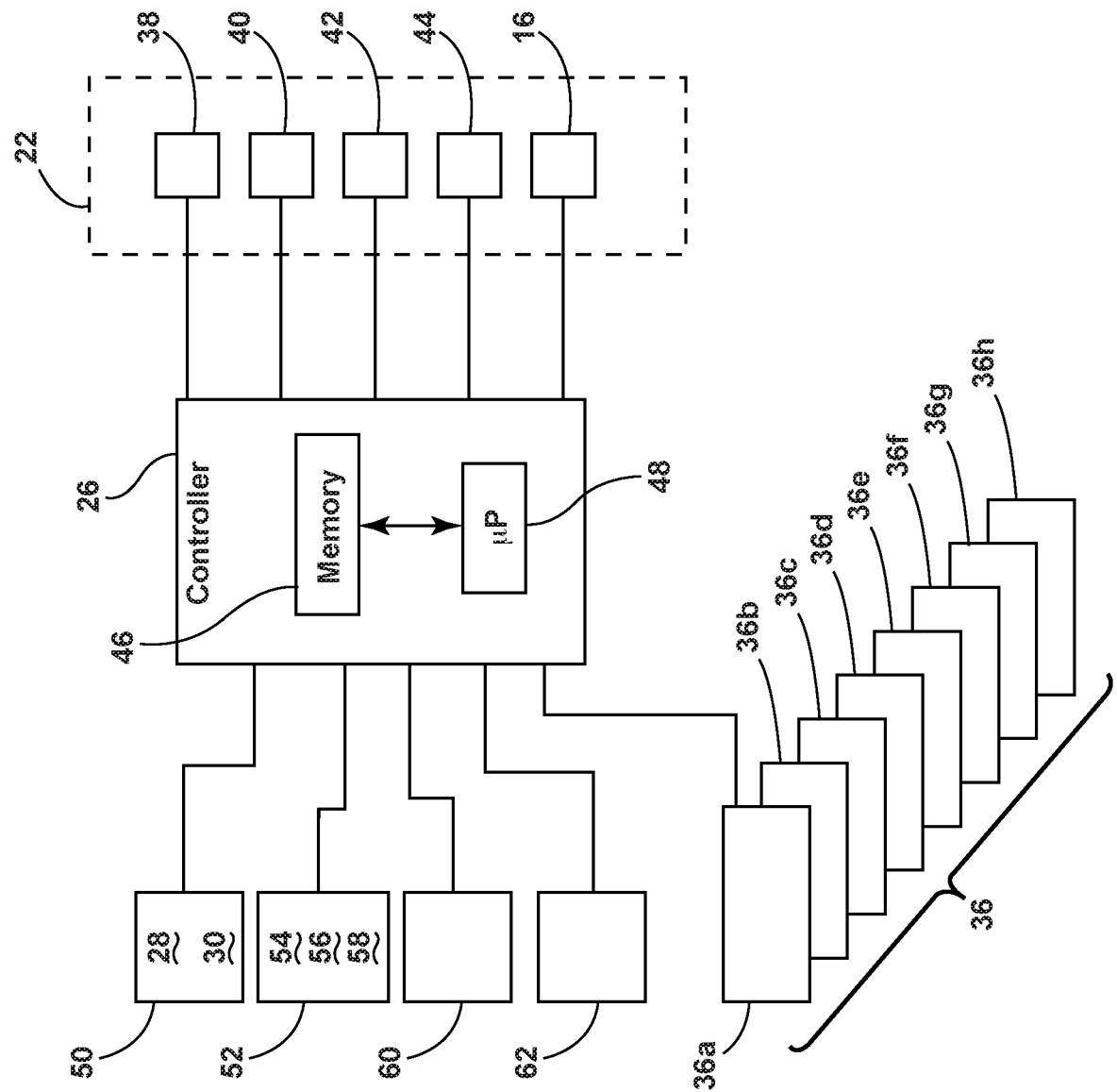
FIG. 3 is a schematic diagram of a controller for the climate system of the vehicle of FIG. 1, illustrating the controller accepting as input commands from a user of the vehicle, location data, profile data particular to the user, environmental data, and data from various sensors.

Referring now additionally to FIG. 3, as mentioned, the vehicle 10 further includes the controller 26 that controls the climate system 22. In other words, the controller 26 controls the operation of the blower 38, the heating element 40, the cooling element 42, the recirculation flap 44, the one or more windows 16, and any other controllable feature of the climate system 22. More specifically, the controller 26 controls activation and deactivation of the blower 38, the speed of the blower 38, and thus the volume of air that the blower 38 directs into the interior 12. The controller 26 controls positioning of the recirculation flap 44 or any other device to control whether the blower 38 draws air from the exterior 18 to blow into the interior 12 or draws air from the interior 12 to recirculate the air from the interior 12. The controller 26 controls activation and power level of the heating element 40 to increase the temperature of the air that the blower 38 directs into the interior 12. The controller 26 controls activation and power level of the cooling element 42 to decrease the temperature of the air that the blower 38 directs into the interior 12. The controller 26 can also control the raising and lowering of the windows 16 to prevent or allow air from the exterior 18 to enter the interior 12. The controller 26 can also control the activation (and level) of heating or cooling of one or more of the seating assemblies 20. The controller 26 includes memory 46 and a microprocessor 48 that executes one or more programs stored in the memory 46. The memory 46 can include a learnable algorithm program to control the climate system 22 based on certain input data acquired from various sources, as further described below. Alternatively, the algorithm can be stored and processed outside of the vehicle 10 (in the "Cloud") and the controller 26 can receive and implement directives from the Cloud. The sensors 36 upon which the controller 26 relies for vehicle 10 data can include (and are not limited to) the temperature sensor 36a to measure the temperature of the air of the interior 12, a GPS tracker sensor 36b to allow the detection of the location of the vehicle 10, a sensor 36c in the seating assembly 20 from which weight of the user 32 can be determined, one or more sensors 36d in the steering wheel 34 from which the body temperature and heart rate of the user 32 can be determined, an exterior temperature sensor 36e to measure the temperature of the exterior 18 air, an exterior moisture sensor 36f to detect the presence of rain or snow, an exterior light sensor 36g to detect foggy conditions, and an exterior particulate sensor 36h to measure the quality of the exterior 18 air.

As the following explains, the controller 26 implements the algorithm to control the climate system 22 based on at least four types of input: (1) commands 50 from the user 32; (2) location data 52, which is data related to a departure location 54, a destination location 56, and/or a proximate location 58 within a certain proximity to vehicle 10 while moving to the destination location 56; (3) profile data 60, which is data related to information particular to the user 32 of the vehicle 10; and (4) environmental data 62, which is data related to environmental conditions of the exterior 18 of the vehicle 10. The algorithm is a learning algorithm that adjusts weight given to data from sources other than commands 50 from the user 32 based on commands 50 from the user 32 overriding control of the climate system 22 made pursuant to the algorithm based on data from sources other than commands 50 from the user 32.

Commands 50 from the User 32

As mentioned, the controller 26 implements the algorithm to control the climate system 22 based, in part, on commands 50 from the user 32. The user 32 can command control of the climate system 22, such as to raise/lower a set point temperature (e.g., 72 degrees Fahrenheit). The controller 26 then manipulates the blower 38 and the heating element 40 or cooling element 42 to direct heated or cooled air, as the case may be, to the interior 12 until the temperature sensor 36a senses that the air in the interior 12 has reached the set point temperature. In addition, the user 32 can command control of the climate system 22 to cause the blower 38 to recirculate interior 12 air or draw air from the exterior 18, activate/ deactivate a window defrost function, increase/decrease the speed of the blower 38, activate (and set the level of) the heating or cooling of the seating assembly 20, etc.

The user 32 can issue commands 50 in a variety of ways. For example, the user 32 can issue commands 50 via the touch screen display 28, the various physical controls 30, through a voice command system (not illustrated), or via an application program in communication with the controller 26 via a smart phone or some other device (not illustrated).

Location Data 52

In addition, the controller 26 is configured to, and does, control the climate system 22 for the interior 12 based at least in part on location data 52, which includes data related to the departure location 54 of the vehicle 10, the destination location 56 of the vehicle 10, or the proximate location 58 within a certain proximity of the route the vehicle 10 is anticipated to take between the departure location 54 and the destination location 56, or any combination of those locations 54-58. The departure location 54 is the physical location of the vehicle 10 when the vehicle 10 begins a trip. The destination location 56 is the intended physical location of the vehicle 10 at the end of the trip. The controller 26 can anticipate the route the vehicle 10 is to take between the departure location 54 and the destination location 56 via a navigation program. The proximate location 58 within a certain proximity of the route between the departure location 54 and the destination location 56 includes buildings and other properties within a predetermined distance of the vehicle 10 while traveling along the route. The predetermined distance can be, for example, a 1 mile radius.

Figure 4:
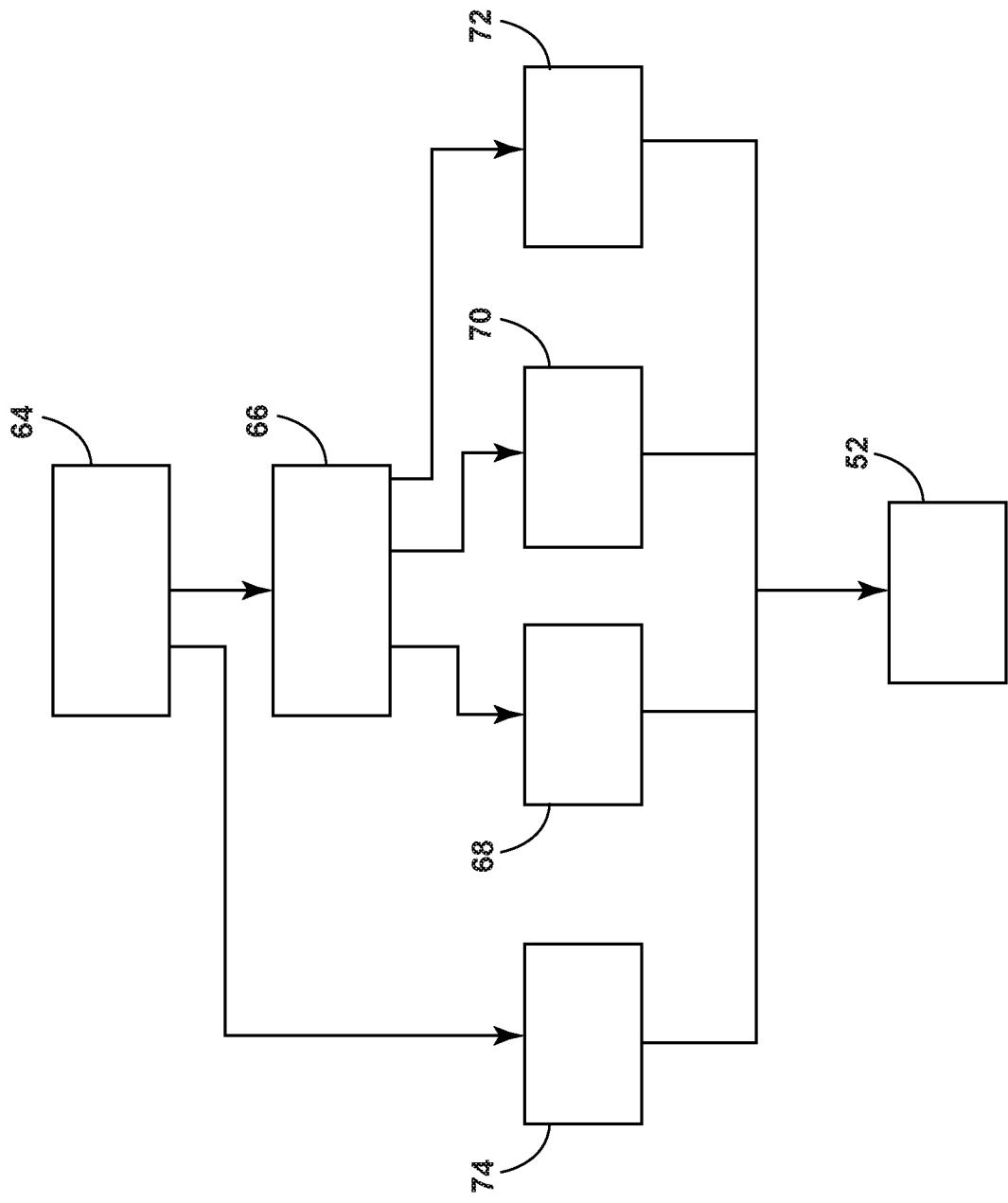
FIG. 4 is a schematic diagram illustrating the development of location data from a temperature profile, an activity profile, and an odor profile assigned to the location after assignment of a characterization of the location from coordinates of the location, as well as from crowd data from other vehicles.

As mentioned, the controller 26 is configured to control the climate system 22 based at least in part on data related to the departure location 54. The controller 26 accepts, as input, location data 52 related to the departure location 54 of the vehicle 10. Referring now to FIG. 4, latitude and longitudinal coordinates 64 of the departure location 54 of the vehicle 10 can be determined via a Global Positioning System (GPS) in communication with the GPS tracker sensor 36b within the vehicle 10. Using the coordinates 64, the departure location 54 of the vehicle 10 can be assigned a categorization 66. The categorization 66 categorizes the primary use of the property at that departure location 54. Such categorizations 66 are available from various platforms including the Google Maps Platform ("types" property in Places API). For example, using the coordinates 64, the controller 26 or some other cloud-based system in communication with the controller 26 can inquire Google Maps Platform or another mapping platform as to the categorization 66 of the departure location 54. There are many available possible categorizations that the Google Maps Platform uses, such as "airport," "bowling alley," "gym," "night club," "casino," "department store," "museum," "shopping mall," and "bakery," among many others. The categorization 66 of the departure location 54 can also be crowd or owner sourced, with the departure location 54 being assigned one of any number of possible categorizations 66, such as "office building," "brewery," "beach," and so on.

The data related to the departure location 54 can further include a temperature profile 68 of the departure location 54. The temperature profile 68 is an assumption regarding temperature of the categorization 66 of the departure location 54 and, more specifically, the difference of that temperature from a comfortable ambient temperature (such as 72 degrees Fahrenheit). For example, upon receiving data that the departure location 54 has a categorization 66 of "movie theater," the controller 26 can be programmed to assign a temperature profile 68 of "cold" (or some other designation meaning that a "movie theater" is assumed to be colder than a comfortable ambient temperature). A temperature profile 68 of "cold" can be assigned to other categorizations 66 such as "casino," "department store," "museum," "shopping mall," etc. Other categorizations 66 can be assigned a temperature profile 68 of "hot" (or some other designation meaning that the categorization 66 is assumed to be warmer than a comfortable ambient temperature). A "bakery" or "tanning salon" categorization 66 can, for example, be assigned a temperature profile 68 of "hot." Other categorizations 66 can be assigned a temperature profile 68 of "hot," such as a "night club" or "bikram yoga studio." These example categorizations 66 and temperature profiles 68 are not meant to be exclusive. The point is that any departure location 54 can be assigned a temperature profile 68 based on Internet accessible and scrapable information (such as categorization 66) about the departure location 54.

The controller 26 is configured to control the climate system 22, and does, at least in part based on the temperature profile 68 of the departure location 54. The concept is for the controller 26 to control the climate system 22 in a manner that counteracts the temperature profile 68 of the departure location 54. If the temperature profile 68 of the departure location 54 is "cold," then it can be assumed that the user 32 entering the vehicle 10 after being at the departure location 54 will also be "cold," and, thus, the controller 26 controls the climate system 22 in a manner to warm the user 32 as soon as possible. The controller 26 can activate the heating element 40 and activate the blower 38 for a period of time to direct heated air into the interior 12 (to blow heated air onto the "cold" user 32) upon activation of the vehicle 10 at the departure location 54, even if the temperature sensor 36a provides data to the controller 26 that the temperature of the air of the interior 12 is above the pre-set temperature. Once the period of time of heating is concluded, the controller 26 can then control the climate system 22 to return the temperature of the air of the interior 12 to the pre-set temperature. On the other hand, if the temperature profile 68 of the departure location 54 is "hot," then it can be assumed that the user 32 entering the vehicle 10 after being at the departure location 54 will also be "hot," and, thus, the controller 26 controls the climate system 22 in a manner to cool the user 32 as soon as possible. The controller 26 can activate the cooling element 42 and activate the blower 38 for a period of time to direct cooled air into the interior 12 (to blow cooled air onto the "hot" user 32) upon activation of the vehicle 10 at the departure location 54, even if the temperature sensor 36a provides data to the controller 26 that the temperature of the air of the interior 12 is below the pre-set temperature. Once the period of time of heating is concluded, the controller 26 can then control the climate system 22 to return the temperature of the air of the interior 12 to the pre-set temperature.

The data related to the departure location 54 can further include an activity profile 70 of the departure location 54. The activity profile 70 is an assumption regarding the activity level of the user 32 based on the categorization 66 of the departure location 54. The greater the assumed activity level of the user 32 at the departure location 54, the more likely the user 32 will be sweaty and feel warmer than normal and thus desire cold air blown into the interior 12 of the vehicle 10 upon departure from the departure location 54. The lesser the assumed activity level of the user 32 at the departure location 54, the more likely the user 32 will feel cooler than normal due to lower pulse rate and thus desire warm air blown into the interior 12 of the vehicle 10 upon departure from the departure location 54. Location categorizations of "gym" and "night club" can be assigned an activity profile 70 of "highly active" or a similar designation denoting a relatively high likelihood that the user 32 will desire cold air blown into the interior 12 of the vehicle 10 upon departure from the departure location 54. Location categorizations of "airport" and "bowling ally" can be assigned an activity profile 70 of "moderately active" or a similar designation denoting some likelihood that the user 32 will desire cooled air blown into the interior 12 of the vehicle 10 upon departure from the departure location 54. Location categorizations of "casino" and "movie theater" can be assigned an activity profile 70 of "sedentary" or a similar designation denoting likelihood that the user 32 will desire warmed air blown into the interior 12 of the vehicle 10 upon departure from the departure location 54. These example location categorizations and activity profiles 70 are not meant to be exclusive.

The controller 26 is configured to control the climate system 22, and does, at least in part based on the activity profile 70 of the departure location 54. The concept is for the controller 26 to control the climate system 22 in a manner that counteracts the activity profile 70 of the departure location 54. If the activity profile 70 of the departure location 54 is "active" or "moderately active," then it can be assumed that people (such as the user 32) entering the vehicle 10 after being at the departure location 54 will have engaged in some measure of physical activity causing the user 32 to be warm and sweaty. Thus, the controller 26 controls the climate system 22 in a manner to cool the user 32 and cause air flow to remove sweat from the user 32. The controller 26 can activate the cooling element 42 and activate the blower 38 for a period of time to direct cooled air into the interior 12 (to blow cooled air onto the warm and sweaty user 32) upon activation of the vehicle 10 at the departure location 54, even if the temperature sensor 36a provides data to the controller 26 that the temperature of the air of the interior 12 is below the pre-set temperature. Once the period of time of cooling is concluded, the controller 26 can then control the climate system 22 to return the temperature of the air of the interior 12 to the pre-set temperature. On the other hand, if the activity profile 70 of the departure location 54 is "sedentary," then it can be assumed that the user 32 entering the vehicle 10 after being at the departure location 54 will have a relatively low pulse rate and may desire warm air. Thus, the controller 26 controls the climate system 22 in a manner to warm the user 32. The controller 26 can activate the heating element 40 and activate the blower 38 for a period of time to direct heated air into the interior 12 (to blow heated air onto the relatively "cold" user 32) upon activation of the vehicle 10 at the departure location 54, even if the temperature sensor 36a provides data to the controller 26 that the temperature of the air of the interior 12 is above the pre-set temperature. Once the period of time of heating is concluded, the controller 26 can then control the climate system 22 to return the temperature of the air of the interior 12 to the pre-set temperature.

The controller 26 is configured to, and does, weigh the data related to the departure location 54 of the vehicle 10 as a function of a length of time spent at the departure location 54. As mentioned above, the controller 26 controls the climate system 22 using an algorithm that accounts for a variety of different types of data in addition to location data 52, such as commands 50 from the user 32, profile data 60, and environmental data 62. Consequently, the algorithm weighs the data from the various sources. Regarding environmental data 62 related to the departure location 54 of the vehicle 10, the longer the length of time that the vehicle 10 has spent at the departure location 54, the more weight the controller 26 (via the algorithm) is configured to give the data related to the departure location 54 of the vehicle 10. For example, assuming that the departure location 54 has a temperature profile of "cold" such that the departure location 54 is assumed to be colder than the comfortable ambient temperature, the longer the length of time the vehicle 10 has been at the departure location 54, the more likely the controller 26 is to activate a blower 38 and a heating element 40 in order to direct warmed air into the interior 12 upon activation of the vehicle 10 at the departure location 54. At one extreme, if the vehicle 10 has been at the "cold" departure location 54 (e.g., movie theater) for five (5) minutes, then it can be assumed that the user 32 of the vehicle 10 has not become "cold" and thus the controller 26 would provide little if any weight to the temperature profile 68 of the departure location 54 in deciding how to control the climate system 22. At the other extreme, if the vehicle 10 has been at the "cold" departure location 54 (e.g., movie theater) for three (3) hours, then it can be assumed that the user 32 of the vehicle 10 has become "cold" and thus the controller 26 would provide greater weight to the temperature profile 68 of the departure location 54 in deciding how to control the climate system 22. A sixty (60) minute stay at the "cold" departure location 54 would cause the controller 26 to provide an intermediate weight between the two preceding extreme examples to the temperature profile 68 of the departure location 54. The same concept applies to the amount weight the controller 26 gives to activity profile 70 data about the departure location 54. The controller 26 weighs the activity profile 70 of a departure location 54 after a sixty (60) minute stay at a departure location 54 more than a three (3) minute stay at that departure location 54.

In addition to the departure location 54, the controller 26 is configured to control, and does control, the climate system 22 based at least in part on location data 52 related to the destination location 56. The controller 26 accepts, as input, location data 52 related to the destination location 56 of the vehicle 10. As with the departure location 54, the coordinates 64 of the destination location 56 can be determined from an address provided by the user 32 via a navigation feature of touch screen display 28. The controller 26 can alternatively assume the coordinates 64 of the destination location 56, as a learning feature of the algorithm, based on the driving habits of the user 32 (e.g., the user 32 of the vehicle 10 typically uses the vehicle 10 to travel a certain destination location 56 at a particular time on particular days). From the coordinates 64, the destination location 56 can be assigned a categorization 66 in the manner described above for the departure location 54. For example, the destination location 56 might be assigned the categorization 66 of "restaurant" or "gym." In addition, as with the departure location 54, the data related to the destination location 56 includes an assigned temperature profile 68 derived from the categorization 66 of the destination location 56. For example, the departure location 54 might be assigned a categorization 66 as a "movie theater" and thus assigned the temperature profile 68 of "cold," i.e., the user 32 would experience air temperature below comfortable ambient air temperature at the destination location 56.

Further, the controller 26 is configured to control the climate system 22, and does, at least in part based on the temperature profile 68 of the destination location 56. The concept is for the controller 26 to control the climate system 22 in a manner that prepares the user 32 of the vehicle 10 for the temperature profile 68 of the destination location 56. If the temperature profile 68 of the destination location 56 is "cold" (i.e., assumed to be colder than a comfortable ambient temperature), then it can be assumed that the user 32 exiting the vehicle 10 and entering the destination location 56 will become "cold," and, thus, the controller 26 controls the climate system 22 in a manner to warm the user 32 before arriving at the destination location 56. For example, if the destination location 56 is assigned a categorization 66 as a "movie theater" and thus assigned a temperature profile 68 of "cold," then the controller 26 can activate the heating element 40 and activate the blower 38 to direct warmed air into the interior 12 to heat the user 32 of the vehicle 10 before the user 32 arrives at the destination location 56. Similarly, if the temperature profile 68 of the destination location 56 is "warm" (i.e., assumed to be warmer than a comfortable ambient temperature) then it can be assumed that the user 32 exiting the vehicle 10 and entering the destination location 56 will become "warm" at the destination location 56, and, thus, the controller 26 controls the climate system 22 in a manner to cool the user 32 before arriving at the destination location 56. For example, if the destination location 56 is assigned a categorization 66 of "bakery" or "tanning salon" (or some other "warm" place) and thus assigned a temperature profile of "hot," then the controller 26 can activate the cooling element and activate the blower 38 to direct cooled air into the interior 12 to cool the user 32 of the vehicle 10 before the user 32 arrives at the destination location 56. The controller 26 can provide more weight to the location data 52 (specifically the temperature profile 68 of the destination location 56) than to the commands 50 of the user 32 regarding pre-set temperature, in order to warm the user 32 or cool the user 32 before reaching the "cold" or "warm" destination location 56, respectively. The controller 26 can begin warming or cooling the user 32, as the case may be, a predetermined time or distance before arriving at the destination location 56.

In addition to the departure location 54 and the destination location 56, the controller 26 is configured to (and does) control the climate system 22 based at least in part on location data 52 related to the proximate location 58 within the certain proximity to the vehicle 10 while the vehicle 10 is moving to the destination location 56 from the departure location 54. In particular, the location data 52 related to the proximate location 58 includes an odor profile 72. Just as the departure location 54 and the destination location 56 can each be categorized, every proximate location 58 within a certain proximity of the vehicle 10 as the vehicle 10 travels along the anticipated route between the departure location 54 and the destination location 56 can be categorized and assigned a categorization 66 as above. Certain proximate location 58 categorizations 66 can be assigned an odor profile 72 (such as "malodorous") that designates the proximate location 58 as a location that produces odors that would likely be unpleasant for the user 32 of the vehicle 10 to smell. Examples of such categorizations 66 might include pet food factories, animal farms, and so on. Using such data, the controller 26 can manipulate the recirculation flap 44 (or any other required mechanism) so that the blower 38 draws air from the interior 12 of the vehicle 10 to recirculate air from the interior 12, before the vehicle 10 gets within a certain proximity of the "malodorous" proximate location 58 while traveling between the departure location 54 and the destination location 56. The controller 26 can also raise the windows 16 to prevent air from the exterior 18 entering the interior 12. After the vehicle 10 passes outside of the certain distance proximate to the "malodorous" proximate location 58, the controller 26 can again manipulate the recirculation flap 44 (or any other required mechanism) so that the blower 38 draws air from the exterior 18 to blow into the interior 12. The controller 26 can also lower the windows 16 to a previous open state, if they were opened before the vehicle 10 entered the certain proximity of the "malodorous" proximate location 56.

In addition to certain profiles (e.g., temperature profile 68, activity profile 70, odor profile 72) based on the categorization 66 of the location (e.g., departure location 54 as "gym"), the location data 52 related to the departure location 54, the destination location 56, and the proximate location(s) 58 can include crowd data 74. Crowd data 74 is data concerning the control of the climate systems of one or more other vehicles. Whereas the temperature profile 68, the activity profile 70, and the odor profile 72 rely on assumptions arising from the categorization 66 of the location, crowd data 74 can indicate how the user 32 of the vehicle 10 would control the climate system 22 of the vehicle 10 at a particular location. Crowd data 74 showing a greater number of other vehicles taking the same climate system 22 control operation at a particular location strengthens the assumption. Therefore, the algorithm more strongly weighs the data from other vehicles, the more often the same climate system control operation is repeated at the departure location 54, the destination location 56, and at the proximate location(s) 58. Utilization of crowd data 74 from other vehicles is particularly helpful when the location is not (or cannot be) assigned a categorization 66. On the other hand, utilization of assumptions like the temperature profile 68 and activity profile 70 based on the categorization 66 of the location is beneficial when crowd data 74 from other vehicles at the location is not available.

For example, consider a departure location 54 that is assigned a categorization 66 that cannot lead to any assumption regarding a temperature profile 68 or activity profile 70 (such as a "pharmacy," which is not known to be either relatively cool or relatively warm). However, crowd data 74 reveals that users of other vehicles control their climate systems in a certain way when departing this departure location 54 (such as activating the cooling element and blower to direct cooled air into the interior, or activating cooling of the seating assembly 20, or both). The algorithm can then consider this crowd data 74 and the controller 26 can control the climate system 22 to match how other vehicles controlled their climate systems at this departure location 54 (such as also activating the cooling element 42 and blower 38, or activating cooling of the seating assembly 20, or both, although the departure location 54 was not assigned a temperature profile 68 of being relatively warm).

As another example, consider a destination location 56 that is unable to be assigned a categorization 66 or is assigned a categorization 66 from which a temperature profile 68 cannot be assumed. Nevertheless, crowd data 74 reveals that users of other vehicles control their climate systems in a certain way before arriving at this destination location 56 (such as activating the heating element and blower to heat the interior, or activating heating of the seating assembly 20, or both, several minutes before arriving at the destination location 56). The algorithm can then consider this crowd data 74 and the controller 26 can control the climate system 22 to match how other vehicles controlled their climate systems before arriving at this departure location 54 (such as also activating the heating element 40 and blower 38 several minutes before arriving at the departure location 54, or activating heating of the seating assembly 20, or both, although the departure location 54 was not assigned a temperature profile 68 of being relatively cold).

As yet another example, consider a proximate location 58 that is unable to be assigned a categorization 66 or is assigned a categorization 66 from which an odor profile 72 cannot be assumed (or assumed incorrectly). Nevertheless, crowd data 74 reveals that users of other vehicles control their climate systems in a certain way when passing within a certain proximity of the proximate location 58 (such as causing interior 12 air to be recirculated and the windows 16 to be raised). The algorithm can then consider this crowd data 74 and the controller 26 can control the climate system 22 to match how other vehicles controlled their climate systems while within a certain proximity of the proximate location 58 (such as also causing interior 12 air to be recirculated and the windows 16 to be raised, although the proximate location 58 was not assigned an odor profile 72 of being "malodorous"). In this particular example, the controller 26 is configured to (and does) cause the blower 38 to recirculate air from the interior 12 while the vehicle 10 is within a certain proximity of a proximate location 58 on the anticipated route between the departure location 54 and the destination location 56 based on crowd data 74 revealing that one or more other vehicles also caused the blower to recirculate air from the interior while those one or more other vehicles were in a certain proximity of the proximate location 58. In the event that the crowd data 74 no longer reveals that users of those other vehicles cause the interior 12 air to be recirculated and the windows 16 to be raised when their vehicles pass that certain location, then the controller 26 can, based on that crowd data 74, not cause the interior 12 air to be recirculated and the windows 16 to be raised. This concept illustrates that crowd data 74 can detect temporary conditions (e.g., a skunk or a factory that was only temporarily malodorous) and the controller 26 can utilize the crowd data 74 nearly contemporaneously to control the climate system 22 only when those temporary conditions exist.

Information Particular to the User 32

In addition to data related to location, the controller 26 is configured to (and does) control the climate system 22 for the interior 12 based on profile data 60, which is data related to information particular to the user 32 of the vehicle 10. The profile data 60 can include, for example, the weight of the user 32, the gender of the user 32, the age of the user 32, the heart rate of the user 32, and the body temperature of the user 32. The preceding list is not exclusive.

The controller 26 can receive profile data 60 regarding the weight of the user 32 from a variety of sources, such as through the user 32 entering weight data in the touch screen display 28, from the sensor 36c in the seating assembly 20, linked remote data (such as a fitness application/program or a scale connected to the Internet), among other sources. Everything else being equal, the controller 26 is more likely to direct heated air into the interior 12 the lighter the weight of the user 32 is. In contrast, the controller 26 is more likely to direct cooled air into the interior 12 the heavier the weight of the user 32 is.

The controller 26 can receive profile data 60 regarding the gender and age of the user 32 from a variety of sources, such as through the user 32 entering gender and age data in the touch screen display 28 or linked remote data (such as a social media account belonging to the user 32), among other sources. Everything else being equal, the controller 26 is more likely to direct heated air into the interior 12 if the gender of the user 32 is female. Everything else being equal, the controller 26 is more likely to direct heated air into the interior 12, the older the age of the user 32 is. Everything else being equal, the controller 26 is more likely to direct cooled air into the interior 12 if the gender of the user 32 is male. Everything else being equal, the controller 26 is more likely to direct cooled air into the interior 12, the younger the age of the user 32 is.

The controller 26 can receive profile data 60 regarding the heart rate of the user 32 from a variety of sources, such as a smart watch in communication with the controller 26 or connected to the Internet, the one or more sensors 36d in the steering wheel 34, and a camera in the vehicle 10 (not illustrated), among other things. Everything else being equal, the controller 26 is more likely to direct heated air into the interior 12, the lower the heart rate of the user 32 is. In contrast, the controller 26 is more likely to direct cooled air into the interior 12, the higher the heart rate of the user 32 is.

The controller 26 can receive data regarding the body temperature of the user 32 from a variety of sources, such as a smart watch in communication with the controller 26 or connected to the Internet, and the one or more sensors 36d in the steering wheel 34. Everything else being equal, the controller 26 is more likely to direct heated air into the interior 12, the lower the body temperature of the user 32 is. In contrast, the controller 26 is more likely to direct cooled air into the interior 12, the high the body temperature of the user 32 is.

The controller 26, via the algorithm, simultaneously utilizes commands 50 from the user 32, location data 52, and the profile data 60 (as well as the environmental data 62, discussed below) to control the climate system 22. In some instances, the algorithm can give more weight to the profile data 60 than to the location data 52. For example, when the controller 26 is receiving profile data 60 about the heart rate of the user 32 (or the body temperature of the user 32), and the departure location 54 has an activity profile 70 that assumes that the user 32 entering the vehicle 10 after being at the departure location 54 will have engaged in physical activity causing the user 32 to be warm and sweaty, the controller 26 could (via the algorithm) activate the blower 38 and the cooling element in order to direct cooled air into the interior 12 upon activation of the vehicle 10 at the departure location 54, only if the profile data 60 reveals that the heart rate of the user 32 is above a predetermined heart rate (or the body temperature is above a predetermined body temperature). As another example, when the controller 26 is receiving profile data 60 about the body temperature of the user 32, and the departure location 54 has a temperature profile 68 that assumes that the user 32 entering the vehicle 10 after being at the departure location 54 will be relatively cold, the controller 26 could (via the algorithm) activate the blower 38 and the heating element in order to direct heated air into the interior 12 (or heating of the seating assembly 20 or both) upon activation of the vehicle 10 at the departure location 54 for a period of time above the pre-set temperature, even if the temperature sensor 36a provides data to the controller 26 that the temperature of the air of the interior 12 is above the pre-set temperature, but only if the profile data 60 reveals that the body temperature of the user 32 is below a predetermined body temperature. The predetermined heart rate could be a certain percentage above the average heart rate of the user 32 (e.g., 10% above average heart rate) or a fixed heart rate (70 beats per minute). The predetermined body temperature could be a certain percentage above the average body temperature of the user (e.g., 1% above) or a fixed body temperature range (e.g., 97 to 99 degrees Fahrenheit).

As another example, consider the user 32 in the vehicle 10 en route to a destination location 56. The destination location 56 for whatever reason is not assigned a temperature profile 68, but crowd data 74 from other vehicles reveals that users of those other vehicles have activated the heating element 40 and blower 38 to direct heated air into the interior 12 of those other vehicles several minutes before arriving at the destination location 56. Without having profile data 60 concerning the body temperature of the user 32, the controller 26 (implementing the algorithm) might have activated the heating element 40 and the blower 38 to direct heated air into the interior 12 of the vehicle 10 before arriving at the destination location 56. However, the controller 26 could be receiving profile data 60 concerning the body temperature of the user 32, and thus could activate the heating element 40 and the blower 38 in order to direct warmed air into the interior 12 before arriving at the destination location 56, only if the body temperature of the user 32 is below a predetermined temperature. That prevents the controller 26 from directing heated air into the interior 12 when the user 32 is already warm (perhaps the user 32 is running a fever).

Environmental Data 62

In addition to data related to commands 50 from the user 32, location data 52, and profile data 60, the controller 26 is configured to (and does) control the climate system 22 for the interior 12 based on environmental data 62, which is related to the environmental conditions of the exterior 18 of the vehicle 10. The environmental conditions include the weather. The controller 26 can receive data related to the weather from a weather data service supplier. In addition, as briefly mentioned above, the vehicle 10 can include various sensors including the exterior temperature sensor 36e, the exterior moisture sensor 36f, and the exterior light sensor 36g, which can provide relevant environmental data 62 to the controller 26. The environmental conditions additionally include air quality. The vehicle 10 can include the exterior particulate matter sensor 36h to measure air quality.

For example, consider the vehicle 10 en route to a destination location 56, there is no proximate location 58 assigned an odor profile 72 of being "malodorous," and there is no crowd data 74 revealing a proximate location 58 where users of other vehicles are causing air to be recirculated. However, if the controller 26 receives environmental data 62 from the exterior particulate matter sensor 36h that the quality of the air surrounding the vehicle 10 is bad, then the controller 26 can cause the windows 16 to close and the blower 38 to recirculate interior 12 air instead of drawing air from the exterior 18. This example illustrates how the controller 26 via the algorithm can take into account multiple data types and weigh a certain data type (here, environmental data 62) sufficiently high to cause the controller 26 control the climate system 22. If, for whatever reason, the user 32 issues a command 50 to override the controller 26 (e.g., stopping the blower 38 from recirculating interior 12 air after the controller 26 caused the climate system 22 to do so), the algorithm learns from the command 50 of the user 32 and would weigh the data that caused the controller 26 to take the initial climate system 22 action less (e.g., the algorithm might ignore environmental data 62 from the exterior particulate matter sensor 36h while en route to the destination location 56).

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departure from the concepts of the present disclosure, and further it is to be understood that such concepts are intended to be covered by the following claims unless these claims by their language expressly state otherwise.

What is claimed is:

1. A vehicle comprising:
   an interior; and
   a controller configured to control a climate system for the interior based on data from other than a command from a user, the data including at least a categorization of one or more of: (i) a departure location of the vehicle, (ii) a destination location of the vehicle, and (iii) a proximate location within a certain proximity to the vehicle while moving to the destination location from the departure location;
   wherein, the categorization categorizes a primary use of the departure location, an odor profile of the proximate location, or the primary use of the destination location.

2. The vehicle of claim 1,
   wherein, the climate system includes a blower that directs air into the interior, a heating element in air communication with the blower, a cooling element in air communication with the blower, and a recirculation flap in air communication with the blower; and
   wherein, the controller controls activation and deactivation of the blower, a volume of the air that the blower directs to the interior, the heating element to increase a temperature of the air that the blower directs to the interior, the cooling element to decrease the temperature of the air that the blower directs to the interior, and the recirculation flap to control whether the blower draws the air from an exterior to blow into the interior or draws air from the interior to recirculate the air from the interior.

3. The vehicle of claim 1,
   wherein, the controller is configured to control the climate system based at least in part on the categorization of the departure location and a temperature profile of the departure location that is assumed from the categorization of the departure location.

4. The vehicle of claim 3, wherein the temperature profile of the departure location assumes that the departure location is colder than a comfortable ambient temperature, and the controller is configured to direct heated air into the interior upon activation of the vehicle at the departure location.

5. The vehicle of claim 3, wherein the temperature profile of the departure location assumes that the departure location is warmer than a comfortable ambient temperature, and the controller is configured to direct cooled air into the interior upon activation of the vehicle at the departure location.

6. The vehicle of claim 1,
   wherein, the controller is configured to control the climate system based at least in part on the categorization of the departure location and an activity profile of the departure location that is assumed from the categorization of the departure location.

7. The vehicle of claim 6, wherein the activity profiled of the departure location assumes that the user entering the vehicle after being at the departure location will have engaged in physical activity causing the user to be warm and sweaty, and the controller is configured to direct cooled air into the interior upon activation of the vehicle at the departure location.

8. The vehicle of claim 1,
   wherein, the controller is configured to control the climate system based at least in part on the categorization of the destination location and a temperature profile of the destination location that is assumed from the categorization of the destination location.

9. The vehicle of claim 8, wherein the temperature profile of the destination location assumes that the destination location is colder than a comfortable ambient temperature, and the controller is configured to direct warmed air into the interior before the vehicle arrives at the destination location.

10. The vehicle of claim 8, wherein, the temperature profile of the destination location assumes that the destination location is warmer than a comfortable ambient temperature, and the controller is configured to direct cooled air into the interior before the vehicle arrives at the destination location.

11. The vehicle of claim 1,
    wherein, the controller is configured to control the climate system based at least in part on the categorization of the odor profile of the proximate location; and
    wherein, the controller is configured to recirculate air from the interior based at least in part on the odor profile.

12. The vehicle of claim 1, wherein the controller is further configured to control the climate system based at least in part on crowd data concerning control of a climate system of another vehicle.

13. The vehicle of claim 12, wherein the controller is configured to recirculate air from the interior while the vehicle is within the certain proximity of the proximate location while en route to the destination location based on the crowd data that one or more other vehicles also caused recirculation of air from the interior while those one or more other vehicles were in the certain proximity of the proximate location.

14. The vehicle of claim 1, wherein the controller is configured to control the climate system of the interior based at least in part on the categorizations of the departure location of the vehicle, the destination location of the vehicle, and the proximate location.

15. A vehicle comprising:
    an interior; and
    a controller configured to control a climate system for the interior based on data from other than a command from a user, the data including at least:
    information particular to the user of the vehicle; and
    a categorization of: (i) a departure location of the vehicle, (ii) a destination location of the vehicle, or (iii) a proximate location within a certain proximity of the vehicle while the vehicle is en route to the destination location;
    wherein, the categorization categorizes a primary use of the departure location, an odor profile of the proximate location, or the primary use of the destination location.

16. The vehicle of claim 15,
    wherein, the information particular to the user includes a heart rate of the user;
    wherein, the controller is configured to control the climate system based at least in part on the categorization of the departure location and an activity profile that is assumed from the categorization of the departure location, and the activity profile assumes that the user entering the vehicle after being at the departure location will have engaged in physical activity causing the user to be warm and sweaty; and wherein, the controller is configured to direct cooled air into the interior upon activation of the vehicle at the departure location, if the heart rate is above a predetermined heart rate.

17. The vehicle of claim 15,
wherein, the information particular to the user includes a body temperature of the user;
wherein, the controller is further configured to control the climate system based at least in part on crowd data, and the crowd data from other vehicles reveal that users of other vehicles have directed heated air into the interior of those other vehicles before arriving at the destination location; and
wherein, the controller is configured to direct warmed air into the interior before arriving at the destination location, if the body temperature of the user is below a predetermined temperature.

18. The vehicle of claim 15,
wherein, the controller is further configured to control the climate system for the interior based in part on data related to environmental conditions at an exterior of the vehicle; and
wherein, the environmental conditions include weather and air quality.

19. A vehicle comprising:
an interior; and
a controller configured to control a climate system for the interior based at least in part on data related to a departure location of the vehicle;
wherein, the controller is configured to weigh the data related to the departure location of the vehicle as a function of a length of time spent at the departure location, such that the longer the length of time the vehicle has spent at the departure location, the more weight the controller is configured to give to the data related to the departure location of the vehicle.

20. The vehicle of claim 19,
wherein, the departure location has a temperature profile, and the temperature profile of the departure location assumes that the departure location is colder than a comfortable ambient temperature, and the longer the length of time the vehicle has been at the departure location, the more likely the controller is to direct warmed air into the interior upon activation of the vehicle at the departure location.

* * * * *